May 2, 1933.  E. R. WILLIAMS  1,907,166
SEPARATOR
Filed July 11, 1931  3 Sheets-Sheet 3

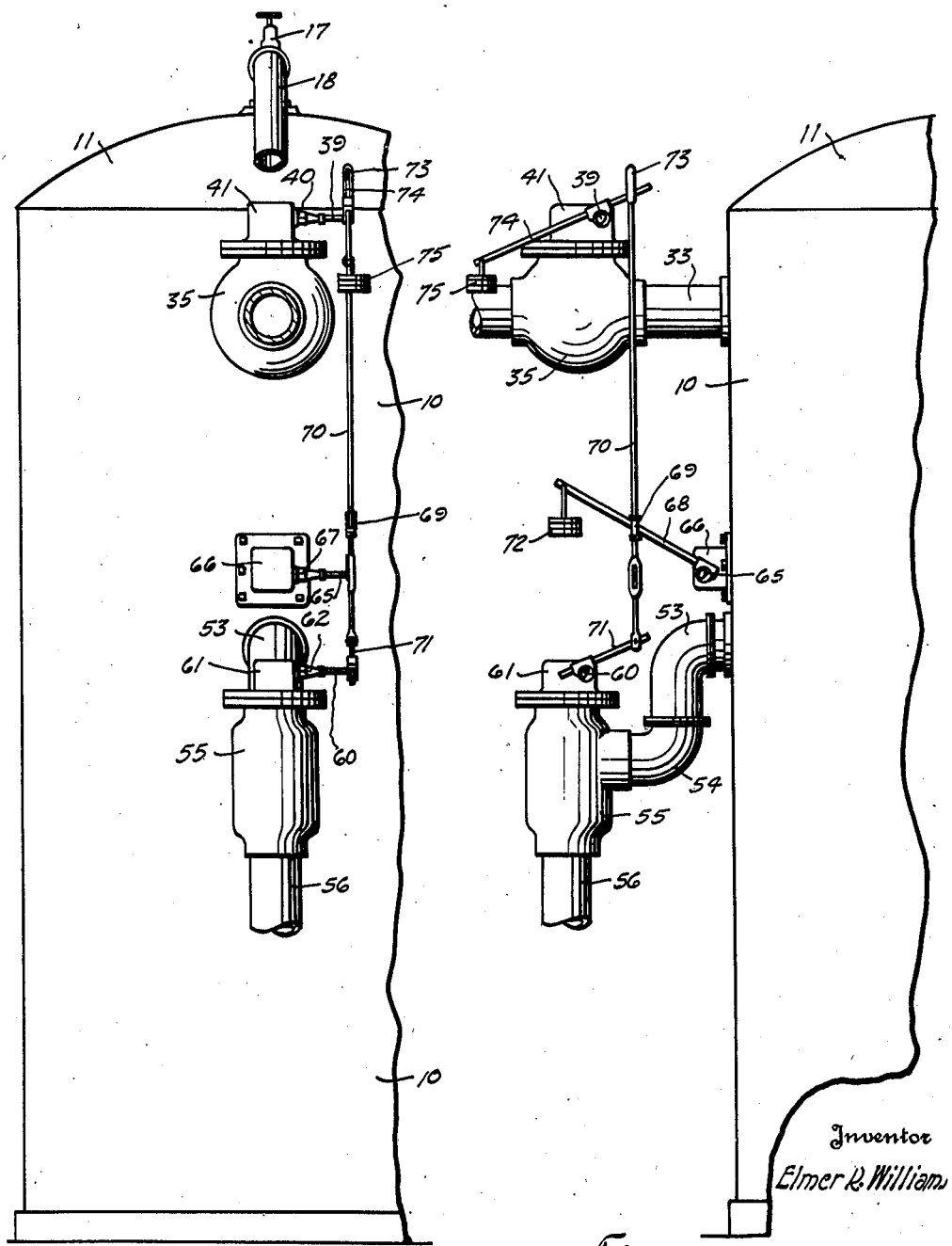

Inventor
Elmer R. Williams
By
Jack W. Ashley
Attorney

Patented May 2, 1933

1,907,166

UNITED STATES PATENT OFFICE

ELMER R. WILLIAMS, OF TULSA, OKLAHOMA, ASSIGNOR TO NATIONAL TANK COMPANY, OF TULSA, OKLAHOMA, A CORPORATION OF OKLAHOMA

SEPARATOR

Application filed July 11, 1931. Serial No. 550,169.

This invention relates to new and useful improvements in separators.

One object of the invention is to provide a separator wherein the influent from the well is brought into the upper portion of the tank and a primary separation of the liquid and gaseous fluids carried out, the gaseous fluids being carried downwardly and scrubbed and the baffled oil together with the liquid from the influent being conducted into a segregated chamber at the lower portion of said tank.

By this arrangement the influent liquid is immediately carried out of the path of the influent gaseous fluids and the baffled liquids together with the influent liquid are carried off to a separate chamber away from the gases.

A further object of the invention is to provide a gravity-operated controlling device connected with the liquid and gas outlet valves for receiving liquid from the collecting chamber, to operate said valves when receiving a predetermined quantity of liquid.

A further object of the invention is to provide a conductor from the liquid collecting chamber up into the gravity-operating device which is exterior of the chamber, in conjunction with a liquid column, whereby the liquid is displaced from the collecting chamber into the conductor by incoming liquid.

A construction designed to carry out the invention will be hereinafter described together with other features of the invention.

Figure 1:
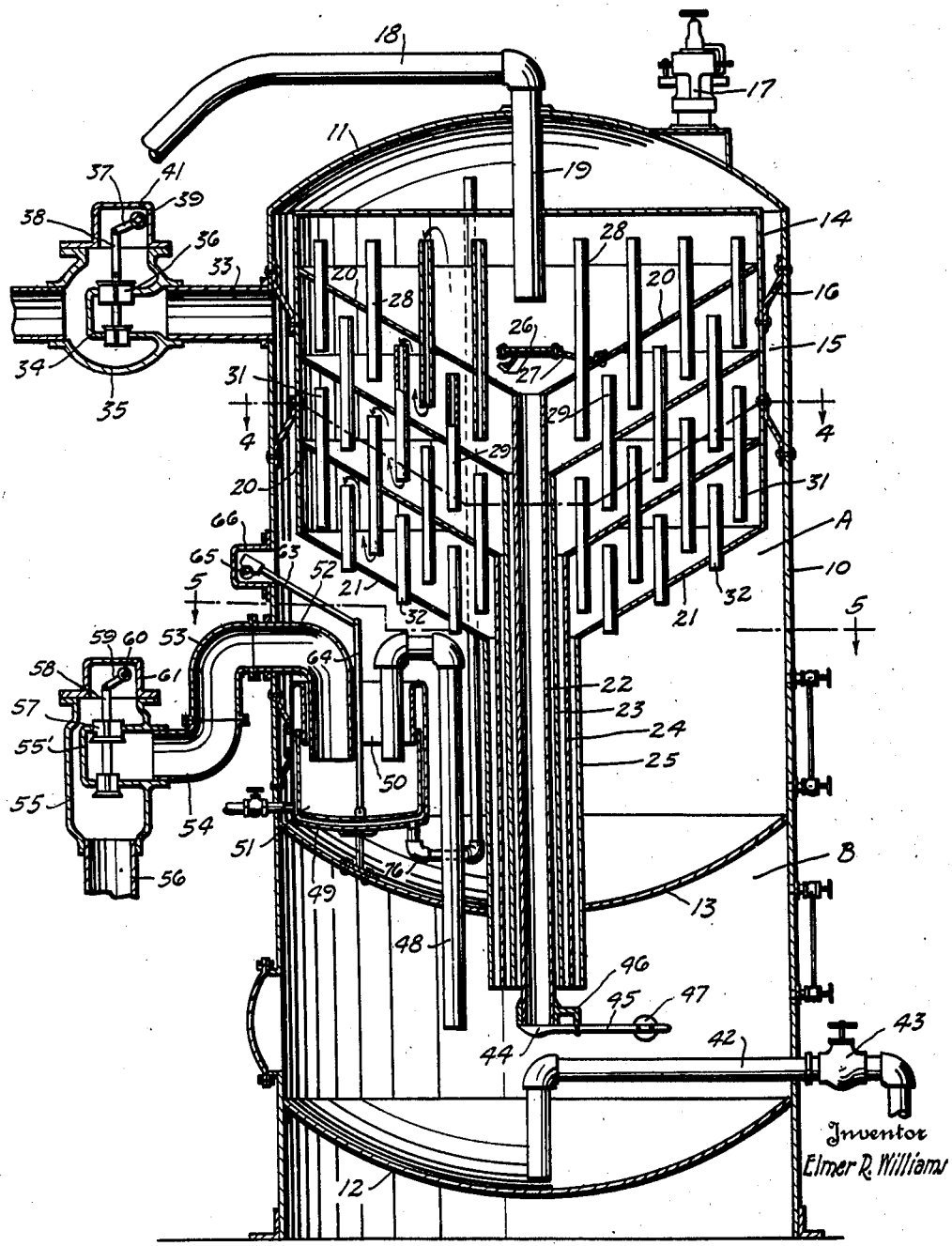
Figure 4:
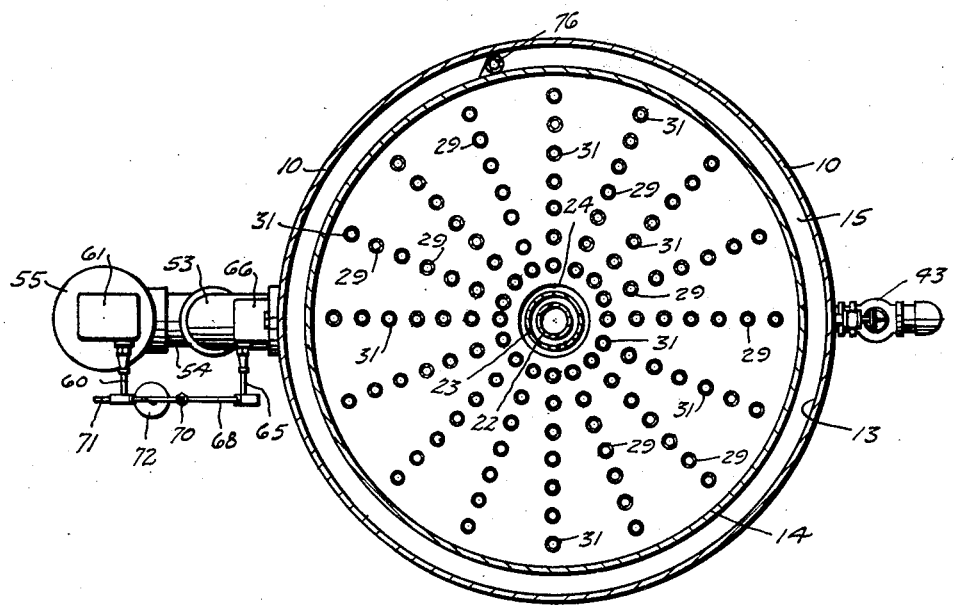
Figure 5:
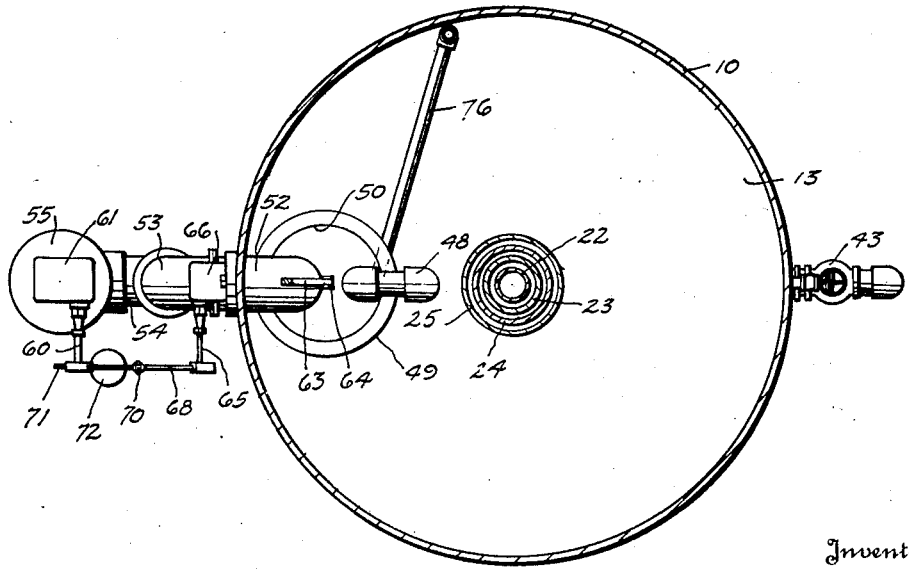

The invention will be more readily understood from a reading of the following specification and by reference to the accompanying drawings in which an example of the invention is shown, and wherein:

Figure 1 is a vertical sectional view of a separator constructed in accordance with the invention, Figure 2 is a partial elevation of the separator tank showing the valve mechanism, Figure 3 is an elevation at right angles to Figure 2, Figure 4 is a horizontal cross-sectional view taken on the line 4—4 of Figure 1, and Figure 5 is a horizontal cross-sectional view taken on the line 5—5 of Figure 1.

In the drawings the numeral 10 designates an upright cylindrical metal tank which is illustrated as having a crowned top 11 and a concaved false bottom 12. The tank is divided into an upper chamber A and a lower chamber B by a concaved or dished transverse partition 13 placed somewhat below the mid-height of the tank so that the upper chamber is considerably larger than the lower chamber.

Within the upper portion of the chamber A is mounted a cylindrical conductor or drum 14, preferably in concentric relation to the wall of the tank so as to provide an annular upright passageway 15 therebetween. The drum is supported by brackets 16 as is best shown in Figure 1. The top of the drum is adjacent the top 11 and a suitable safety valve 17 is mounted on the latter. An influent pipe 18 having suitable connection with the well pipe (not shown) is connected to a vertical discharge pipe extending down through the top of the tank and through the top of the drum, axially thereof.

Within the drum are disposed a plurality of superposed inverted conical partitions 20, which are spaced apart and inclined downwardly toward the center of the drum at the same inclination as the bottom 21 of said drum. Three of such partitions have been shown but the number may be varied. Concentric tubular conductors 22, 23, 24 and 25 respectively depend from the parts 20 and 21 as is clearly shown in Figure 1. These conductors extend through the partition 13 so as to discharge into the lower chamber B.

The central conductor 22 is located under the discharge pipe 19 but a deflector 26 is interposed therebetween and supported on the upper partition 20 by brackets 27. The influent from the well comprises a mixture of oil, water, gas and sand and the proportions of these ingredients vary according to the character of the well. The influent is discharged from the pipe 19 against the deflector 26 and its velocity somewhat checked and its force broken. The oil, water and sand will pass down the upper partition 20 into the conductor 22 while the gaseous fluids will tend to rise in the drum. These gaseous fluids will be somewhat agitated in the upper portion of the drum and scrubbed against the metal walls therein so that some oil will be extracted and delivered to the conductor 22.

Small tubes 28 penetrating the upper partition 20 are secured in said partition intermediate their ends. These tubes terminate short of the next lowest partition which supports similar tubes 29 carried in the next lowest partition. Still other tubes 31 and 32 are arranged in the third partition and the bottom 21. These tubes are disposed in staggered relation and the upper ends of the three lower sets extend above the lower ends of the next higher sets. It is obvious that gaseous fluids entering the tubes 28 will pass down the same and discharge between the first and second partitions. The remaining gases will then ascend and pass down through the tubes 29 into the next lowest space, then through the tubes 31 into the next lowest space and finally into the next lowest space and downward through the tubes 32 as is indicated by the arrows in Figure 1. By this arrangement the gaseous fluids which are seeking an outlet will pursue a circuitous path and will pass through four stages of scrubbing while in the drum. Liquids will be extracted between each partition and will be drained into the chamber B by the conductors 23, 24 and 25 respectively.

A gas outlet pipe 33 extends from the wall of the tank opposite the drum 14 and while placed nearer the top thereof could be placed at any suitable position above the bottom 21. This being the only gas outlet in the chamber A it is obvious that the gas will be drawn downward through the tubes and finally discharged through the pipe 33. The pipe 33 is connected with the bonnet 34 of a valve case 35. A pair of valves 36 are seated in the bonnet and the upper is larger than the lower valve as is the usual practice. Valves of this type are in common use and form no particular part of the invention. The valves 36 are suspended from a crank arm 37 by a link 38 and said crank arm is fastened on a rock-shaft 39 extending through a packing box 40 (Figure 2) on the cap 41 of the valve case. The extent to which these valves are opened controls the escape of the gas and either permits it to freely escape or retards the escape to such an extent as to build up a pressure within the tank 10.

A drain pipe 42 is mounted in the bottom of the tank over the bottom 12 for syphoning out the sand and water, and includes a valve 43 which may be periodically opened for this purpose. The end of the tube 22 extends below the other conductors in the chamber B and its lower end is closed by a flap valve 44 carried on the end of a lever 45 as is shown in Figure 1. This lever is pivoted intermediate its ends on a bracket 46 and its valve 44 is held against the lower end of the tube by a counter-weight 47 on the opposite end of the lever. It will be seen that the lower end of the tube 22 normally being closed sufficient liquid must be collected in said tube to overcome the weight 47 and open the valve. This prevents liquid collected in the chamber B from flowing back into the pipe 22.

A goose neck pipe 48 suitably supported in the partition 13 extends from the chamber B up into the chamber A and discharges into a cylindrical guard casing 49 having an inturned annular flange 50 depending therein. A bucket 51 is mounted in the casing and has its upper end telescoping the flange 50. This bucket forms part of a control device which is set forth in a co-pending application filed March 6, 1931, Serial No. 520,691, and the illustration herein is merely for the purpose of showing a control, the details of which form no particular part of the present invention.

An elbow 52 extends from within the casing 49 through the wall of the tank and is connected to a pair of elbows 53 and 54. The latter is connected in the bonnet 55' of a valve case 55 having a liquid discharge pipe 56 connected to its lower end. A pair of valves 57 are seated in the bonnet 55 and open downwardly. It will be noted that the valves 57 operate oppositely to the valves 36. The valves 57 are suspended by a link 58 pivoted to an arm 59 mounted on a rock-shaft 60 journalled in the cap 61 of the case 55 and extending through a stuffing box 62 as is best shown in Figure 2.

The bucket 51 is suspended from an arm 63 by a link 64. The arm is fastened on a rock-shaft 65 journalled in a bonnet 66 secured to the side of the tank. The shaft 65 extends through a stuffing box 67 on the side of the bonnet. An arm 68 is fastened on the shaft 65 and extends outwardly therefrom as is best shown in Figure 3. A counter weight 72 is suspended from the outer end of the arm. The arm passes through an eye 69 included in an adjustable link 70. The lower end of the link is pivoted to one end of an arm 71. This arm is fastened on the shaft 60. The upper end of the link 70 is provided with a loop 73 receiving one end of a lever 74 carrying counter weights 75 on its opposite end. This lever is fastened on the shaft 39.

As hereinbefore pointed out the only escape for the gas other than the safety valve 17 is by way of the pipe 33 and past the gas valves 36. If these valves are wide open the gas will freely escape, but if the valves are partially open, the escape of gas will be retarded and consequently a back pressure will be built up within the tank. In order to hold the gas valves in a partially open position it is necessary to use the counter weights 75 so as to resist the force of the gas in lifting the valves 36. These weights may be varied in accordance with the flow of the gas and the degree of pressure desired. Under usual conditions the gas valves 36 would be partially open and the liquid valves 57 fully closed.

When the influent is discharged from the pipe 19 into the drum 14 it will be deflected by the deflector 26 and will thus not unduly agitate the liquid standing in the tube 22. The gaseous fluids will rise and escape downward through the tubes 28 and successively through the tubes 29, 31 and 32 into the chamber A. The gas will finally escape through the pipe 33 after rising in the channel 15. The gaseous fluids in passing through the tubes and between the partitions will be scrubbed so that liquids will be extracted therefrom and such liquids drained from the drum through the conductors 23, 24 and 25 into the chamber B.

When the column of liquid in the tube 22 is sufficient to overcome the weight 47 it will be discharged into the lower chamber B. Liquid discharged into the chamber B will be forced upward through the gooseneck 48 and discharged into the bucket 51. When this bucket is filled to a point where its load will overbalance the counter-weight 75 the shaft 65 will be rocked and the valves 57 opened. Owing to the loop 73 the valves 57 may be opened to a certain extent without disturbing the lever 74 or the case valves 36. Under usual operating conditions the bucket will be constantly supplied with liquid and the valves 57 will be maintained in a partially open position so that substantially as much liquid will be discharged from the chamber B as is received therein and thus a fixed oil level will be maintained. In order to balance the gas pressure a pipe 76 extends from the bottom of the casing 49 up through the channel 15 to the top portion of the tank 10 and open to the pressure of the gas therein.

Various changes in the size and shape of the different parts, as well as modifications and alterations, may be made within the scope of the appended claims.

Having illustrated and described a preferred form of the invention, what I claim, is:

1. In a separator, an upright tank having a liquid collecting chamber at its bottom and a gas chamber above the collecting chamber separated therefrom by a transverse partition, a container in the gas chamber of the tank for receiving the influent, means for introducing the influent directly into the container, a conductor for carrying the liquid from the container to the collecting chamber of the tank, means in the container for scrubbing the gaseous fluids, the container having an outlet into the gas chamber of the tank, a gas outlet from the gas chamber of the tank, and a liquid outlet from the tank.

2. A separator as set forth in claim 1 and a valve for controlling the gas outlet, a valve for controlling the liquid outlet, and automatic control means within the tank operated by the weight of the liquid and connected with said valves for operating the same.

3. A separator as set forth in claim 1 and a trip valve mounted on the lower end of the conductor within the collecting chamber of the tank for supporting a column of liquid in said conductor and for preventing liquid entering the lower end of said conductor.

4. In a separator, an upright tank, a transverse partition within the tank dividing the same into an upper gas chamber and a lower liquid chamber, a drum supported within the gas chamber of the tank and including inclined baffles, an influent pipe extending through the tank into the upper portion of the drum, a conductor pipe extending from the upper portion of the drum downwardly through the baffles and into the collecting chamber of the tank, a control device mounted in the gas chamber of the tank, a conduit extending from the collecting chamber to the control device, a liquid outlet valve connected with the control device, a gas outlet valve connected with the gas chamber of the tank, and means connected with the control device for operating said valves.

5. In a separator, an upright tank, a primary separating container mounted within the tank, an influent conductor extending through the tank into the container, means in the container for carrying the liquids downwardly and discharging the same into the tank, and means in the container for carrying the gaseous fluids downwardly in a circuitous path separately from and out of contact with the downwardly flowing oil and including baffles for scrubbing the gaseous fluids during their travel.

6. A separator as set forth in claim 5, and a segregated liquid collection chamber at the bottom of the tank receiving all liquids discharged from the container.

7. A separator comprising, an upright tank, a separating drum mounted in the tank, an influent conductor entering the tank and drum for delivering an oil and gas mixture to said drum, inclined baffle partitions mounted in the drum, upright tubes mounted in the partitions and in the bottom of the drum and having their ends overlapping, said tubes being mounted in staggered relation, the tank having a liquid collection chamber below the drum and a gas collecting portion in the tank above said chamber and outside of said drum, a plurality of conductors leading from the partitions and the bottom of the drum to the collection chamber of the tank, all of said conductors extending through the bottom of the drum, whereby the influent liquid is carried off from the drum to the collection chamber of the tank and the partitions are drained into said collection chamber, and a gas conductor leading from the gas collecting portion of the tank.

In testimony whereof I affix my signature.

ELMER R. WILLIAMS.